(12) United States Patent
Büttner

(10) Patent No.: US 11,642,984 B2
(45) Date of Patent: May 9, 2023

(54) SEAT ATTACHMENT SYSTEM FOR A MASS TRANSIT VEHICLE

(71) Applicant: Bombardier Transportation GmbH, Berlin (DE)

(72) Inventor: Florian Büttner, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 148 days.

(21) Appl. No.: 17/363,122

(22) Filed: Jun. 30, 2021

(65) Prior Publication Data

US 2022/0001771 A1  Jan. 6, 2022

(30) Foreign Application Priority Data

Jul. 1, 2020 (EP) .................................... 20183537

(51) Int. Cl.
*B60N 2/005* (2006.01)
*B60N 2/24* (2006.01)

(52) U.S. Cl.
CPC .............. *B60N 2/005* (2013.01); *B60N 2/242* (2013.01)

(58) Field of Classification Search
CPC ........ B60N 2/005; B60N 2/919; B60N 2/929; B60N 2/242; B60N 2/015; B61D 33/0057; B61D 33/0064; B61D 33/0071

USPC .................................................. 296/63, 65.03
See application file for complete search history.

(56) References Cited

U.S. PATENT DOCUMENTS 10,989,247 B2 * 4/2021 Uppu ...................... H02S 20/00
2020/0116191 A1 * 4/2020 Uppu ...................... H02S 20/00

FOREIGN PATENT DOCUMENTS

EP           0353684 A2 * 2/1990 ............. B61D 33/00

\* cited by examiner

*Primary Examiner* — Jason S Morrow
*Assistant Examiner* — Wenwei Zhuo
(74) *Attorney, Agent, or Firm* — The Webb Law Firm

(57) ABSTRACT

A seat attachment system for a mass transit vehicle including a rail, a fastener and a seat interface. The rail, which is adapted to be secured to a chassis of the mass transit vehicle, has a longitudinal T-slot adapted to receive the fastener. The rail has two non-parallel sets of corrugations on its external face. The seat interface, which is adapted to be mounted to a seat frame, is also provided with two non-parallel sets of corrugations whose angle matches that of the sets of corrugations on the rail. The sets of corrugations are adapted to cooperate and interlock in pairs so as to respectively locate the seat interface, and thereby a seat to which it is attached, vertically and horizontally upon the fastener being tightened.

11 Claims, 4 Drawing Sheets

SEAT ATTACHMENT SYSTEM FOR A MASS TRANSIT VEHICLE

CROSS-REFERENCE TO RELATED APPLICATION

This application claims priority to European Patent Application No. 20183537.8 filed Jul. 1, 2020, the disclosure of which is hereby incorporated by reference in its entirety.

BACKGROUND OF THE INVENTION

Field of the Invention

The present invention relates generally to the field of mass transit vehicles. More particularly, the invention relates to a device for adjustably mounting a seat in such a mass transit vehicle.

Description of Related Art

Most mass transit vehicles comprise seats for passengers. These seats are typically either attached to a floor or to side walls of the mass transit vehicle. During manufacturing of these vehicles, seats may require some variation in their mounting location due to manufacturing tolerances. Moreover, some customer may require an interior arrangement of the passenger compartment with more or less seats than another customer. Consequently, mass transit vehicles are designed to be as generic as possible to reduce manufacturing costs while allowing some flexibility as to the quantity and to the exact locations of passenger seats within the passenger compartment.

One convenient solution is to mount the seats to a longitudinal rail integrated directly in the body structure of the mass transit vehicle, be it the floor or the side walls. This longitudinal rail is typically an aluminum rail having a C section defining a longitudinal slot shaped as a T designed to receive a fastener (known as a T-bolt). A head of the fastener is retained captive by both shoulders of the C section, thereby allowing flexibility in the longitudinal position of the fastener. One seat is then attached to the body of the vehicle via this screw, which is held in position by friction between the head of the screw and the rail. This attachment system is also known as a T-Slot system.

Although T-slot system work reasonably well, the relatively low coefficient of friction between the metals of the fastener and that of the rail require relatively large bolts capable of withstanding a large torque required to develop sufficient friction between the bolt and the rail to hold the seat, itself receiving a passenger load. Using a large quantity of such large fasteners to hold all passenger seats in place contribute to a higher weight and cost of the mass transit vehicle than may be possible. There is therefore a need for an improved seat attachment system.

SUMMARY OF THE INVENTION

It is an object of the present invention to provide a seat attachment system that overcomes or mitigates one or more disadvantages of known seat attachment systems, or at least provides a useful alternative.

According to one aspect of the invention, there is provided a seat attachment system for a mass transit vehicle comprising a rail, a fastener and a seat interface. The rail, which is adapted to be secured to a chassis of the mass transit vehicle, has a longitudinal T-slot. The T-slot defines a first and a second shoulders each located on one opposite side of a narrow portion of the T-slot. The rail has a first set of corrugations extending longitudinally on an external face of the first shoulder and a second set of corrugations on an external face of the second shoulder. The corrugations of the second set of corrugations are non-parallel, and at a predetermined angle, to corrugations of the first set of corrugations. The fastener is adapted to be received within the T-slot. The seat interface, which is adapted to be mounted to a passenger seat, has a third set of corrugations extending longitudinally along a first portion of the seat interface as well as a fourth set of corrugations on a second portion of the seat interface. The fourth set of corrugations is at the same predetermined angle from the third set of corrugations. The third set of corrugations is adapted to cooperate with the first set of corrugations while the fourth set of corrugations is adapted to cooperate with the second set of corrugations. The third set of corrugations is operative to vertically locate the seat interface by interlocking with the first set of corrugations upon a compressive force being developed by the fastener being tightened. Similarly, the fourth set of corrugations is operative to locate horizontally the seat interface by interlocking with the second set of corrugations upon the compressive force being developed by the fastener being tightened.

Optionally, the second and fourth set of corrugations may be perpendicular respectively to the first and to the third set of corrugations.

Optionally, the first and the second sets of corrugations may extend the whole length of the rail.

Optionally, the third and the fourth sets of corrugations extend the whole length of the seat interface.

Optionally, the seat interface may have an aperture for accommodating the fastener. The aperture may be located between the third set of corrugations and the fourth set of corrugations.

Optionally, the passenger seat is provided. The passenger seat has a seat frame to which is mounted the seat interface. The fastener is adapted to fasten the seat frame to the rail so that the passenger seat is secured to the rail.

Optionally, the fastener may be a T-bolt.

According to another aspect of the invention, there is provided a mass transit vehicle comprising a chassis and a passenger compartment, which comprises a seat attachment system as disclosed hereinbefore, wherein the rail of the seat attachment system is secured to the chassis of the mass transit vehicle. The mass transit vehicle may further comprise a passenger seat having a seat frame, the seat interface of the seat attachment system being mounted to the seat frame, the fastener of the seat attachment system being adapted to fasten the seat frame to the rail of the seat attachment system so that the passenger seats is secured to the rail of the seat attachment system.

According to another aspect of the invention, there is provided a mass transit vehicle comprising a chassis and a passenger compartment, which comprises at least a first seat attachment system as described hereinbefore and a second seat attachment system as described hereinbefore, wherein the rail of the first seat attachment system and the rail of the second seat attachment system constitute a single rail secured to a chassis of the mass transit vehicle. The mass transit vehicle may further comprise a row of at least a first passenger seat and a second passenger seat, each having a seat frame, the seat interface of the first seat attachment system being mounted to the seat frame of the first passenger seat, the fastener of the first seat attachment system being adapted to fasten the seat frame of the first passenger seat to the single rail, the seat interface of the second seat attachment system being mounted to the seat frame of the second passenger seat, the fastener of the second seat attachment system being adapted to fasten the seat frame of the second passenger seat to the single rail so that the first passenger seat and the second passenger seat are secured to the single rail.

BRIEF DESCRIPTION OF THE DRAWINGS

These and other features of the invention will become more readily apparent from the following description in which reference is made to the appended drawings wherein.

DESCRIPTION OF THE INVENTION

The present invention provides a seat attachment system capable of positioning and positively mounting passenger seats to a chassis of a mass transit vehicle.

Figure 1:
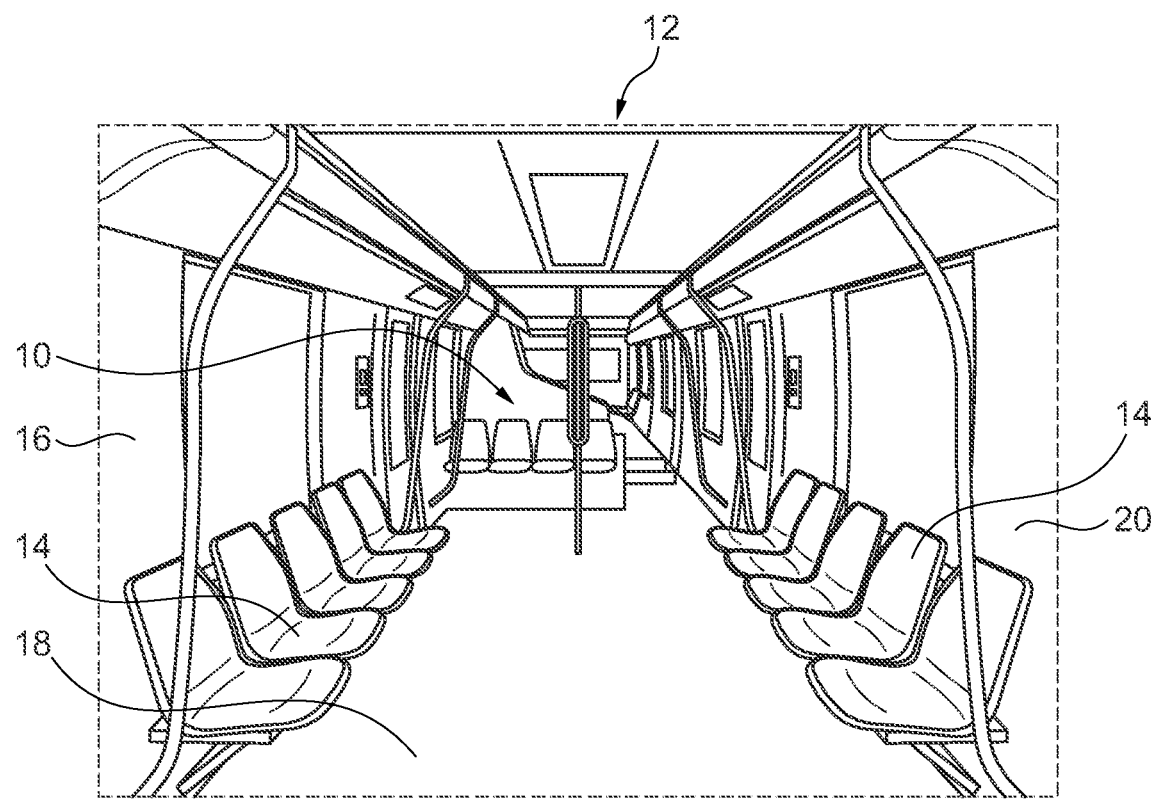
FIG. 1 is a front view with perspective of a passenger compartment of a mass transit vehicle in accordance with an embodiment of the invention.

FIG. 1 depicts a passenger compartment 10 of a mass transit vehicle 12. The mass transit vehicle 12 is here represented by a rail vehicle. Alternatively, the mass transit vehicle could be a bus, a ferry or even an aircraft or a helicopter, for example for transporting army troops. In other words, the mass transit vehicle 12 may typically be a vehicle where passenger seats 14 are preferably aligned along a length or width of the vehicle, although not necessarily. Each passenger seat 14 of the mass transit vehicle 12 is attached to a vehicle structure through its chassis 16. Elements of the chassis 16 which are typically used for attaching the passenger seats 14 are a floor 18 or a wall 20. The wall 20 can either be a side wall, an end wall or an intermediate partition.

Figure 2:
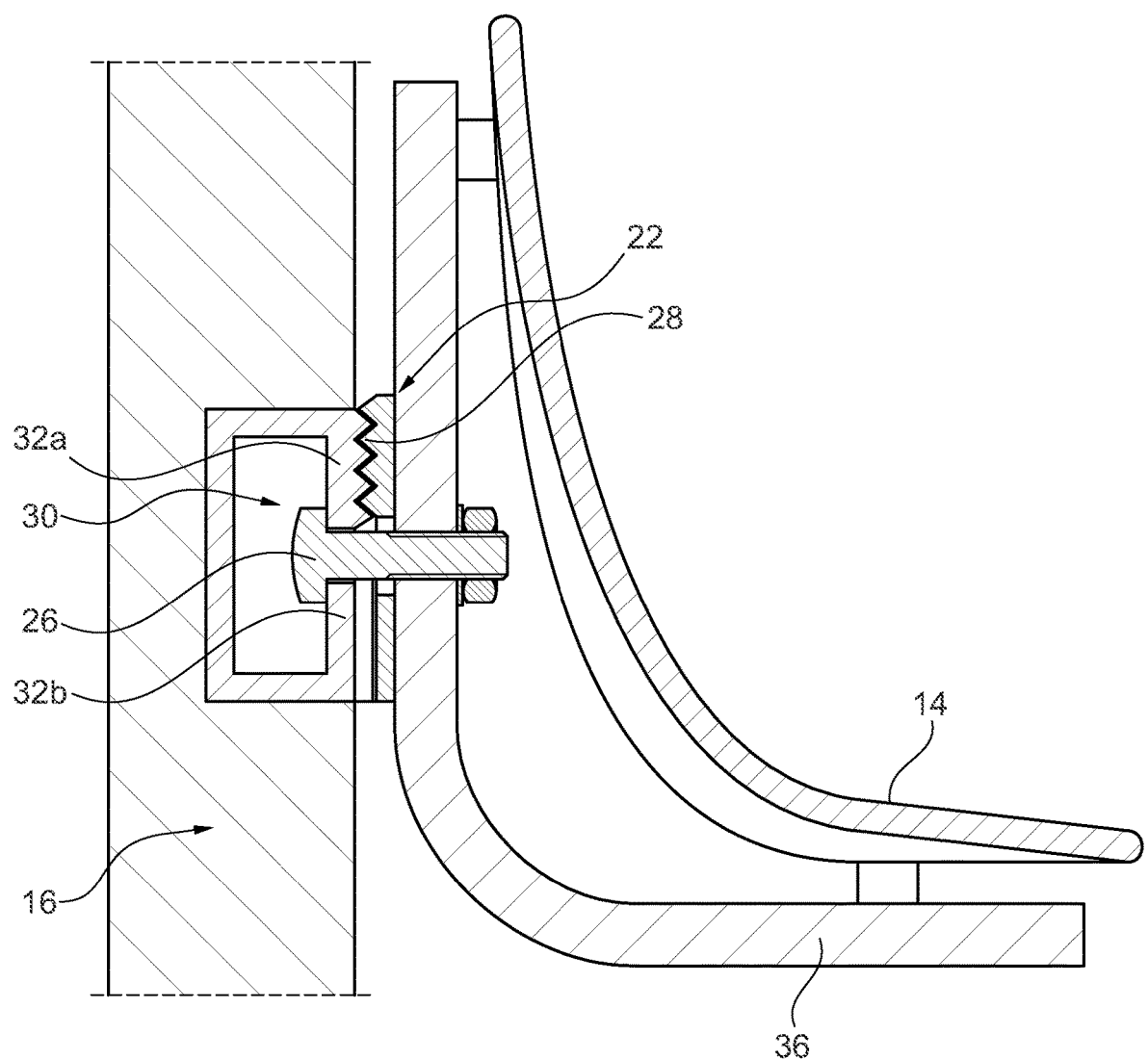
FIG. 2 is a cross-sectional front view of a seat attachment system installation of the mass transit vehicle of FIG. 1.

FIG. 2 is now concurrently referred to. Each passenger seat 14 is mounted to the chassis 16 through a seat attachment system 22. According to one aspect of the invention, the seat attachment system 22 for a mass transit vehicle comprises a rail 24, a fastener 26 and a seat interface 28. The rail 24 is typically made of an aluminum extrusion which is integrated, for example, by welding, in the wall 20. The rail 24 has a longitudinal slot whose cross-section adopts a general shape of a T, hence its name of T-slot. The T-slot 30 defines in the rail 24 two shoulders, first shoulder 32a and second shoulder 32b, each shoulder 32a and 32b being located on one opposite side of a narrow portion, or neck, of the T-slot 30 through which the fastener 26 extends.

Figure 3:
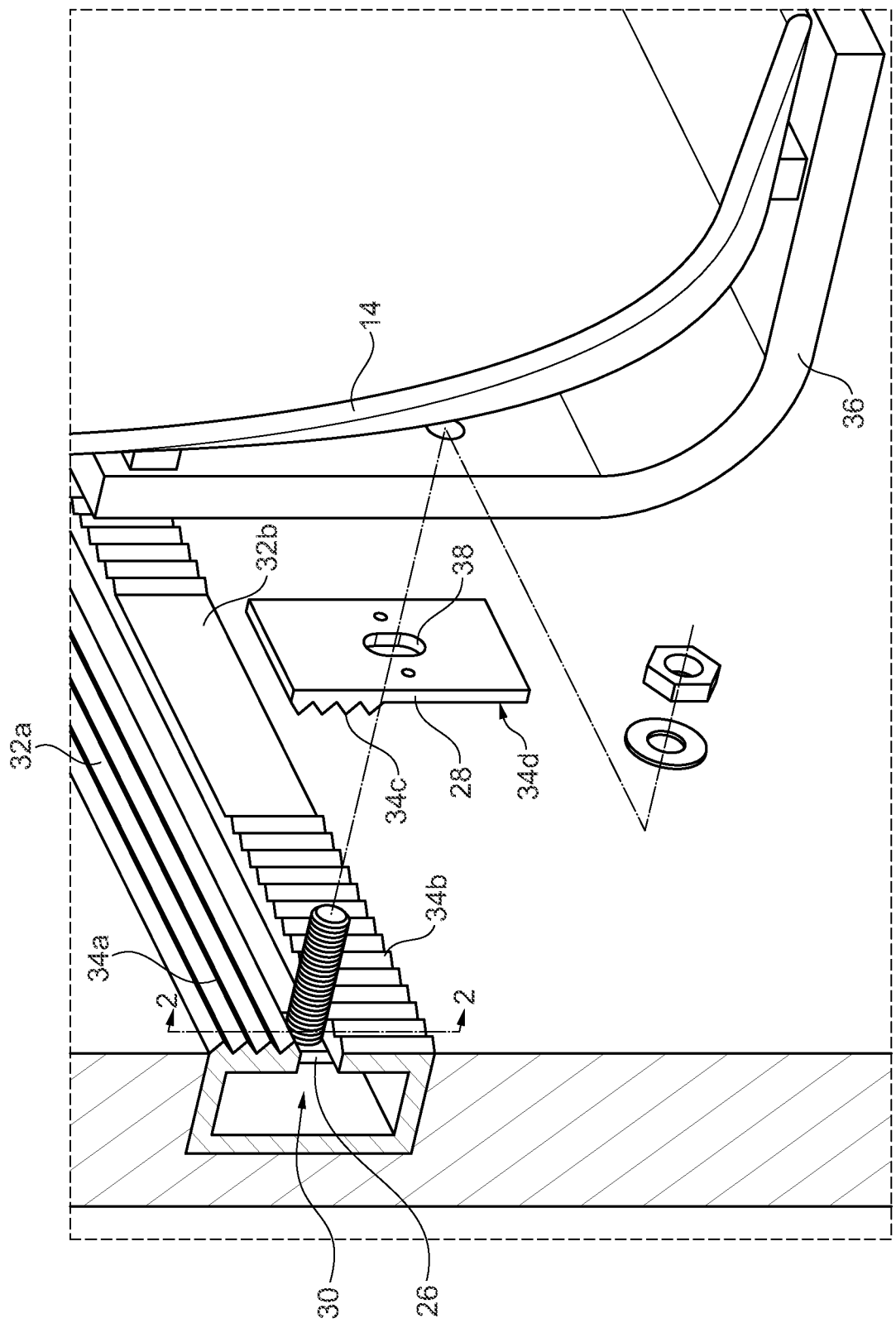
FIG. 3 is an exploded isometric view of the seat attachment system of FIG. 2.
Figure 4:
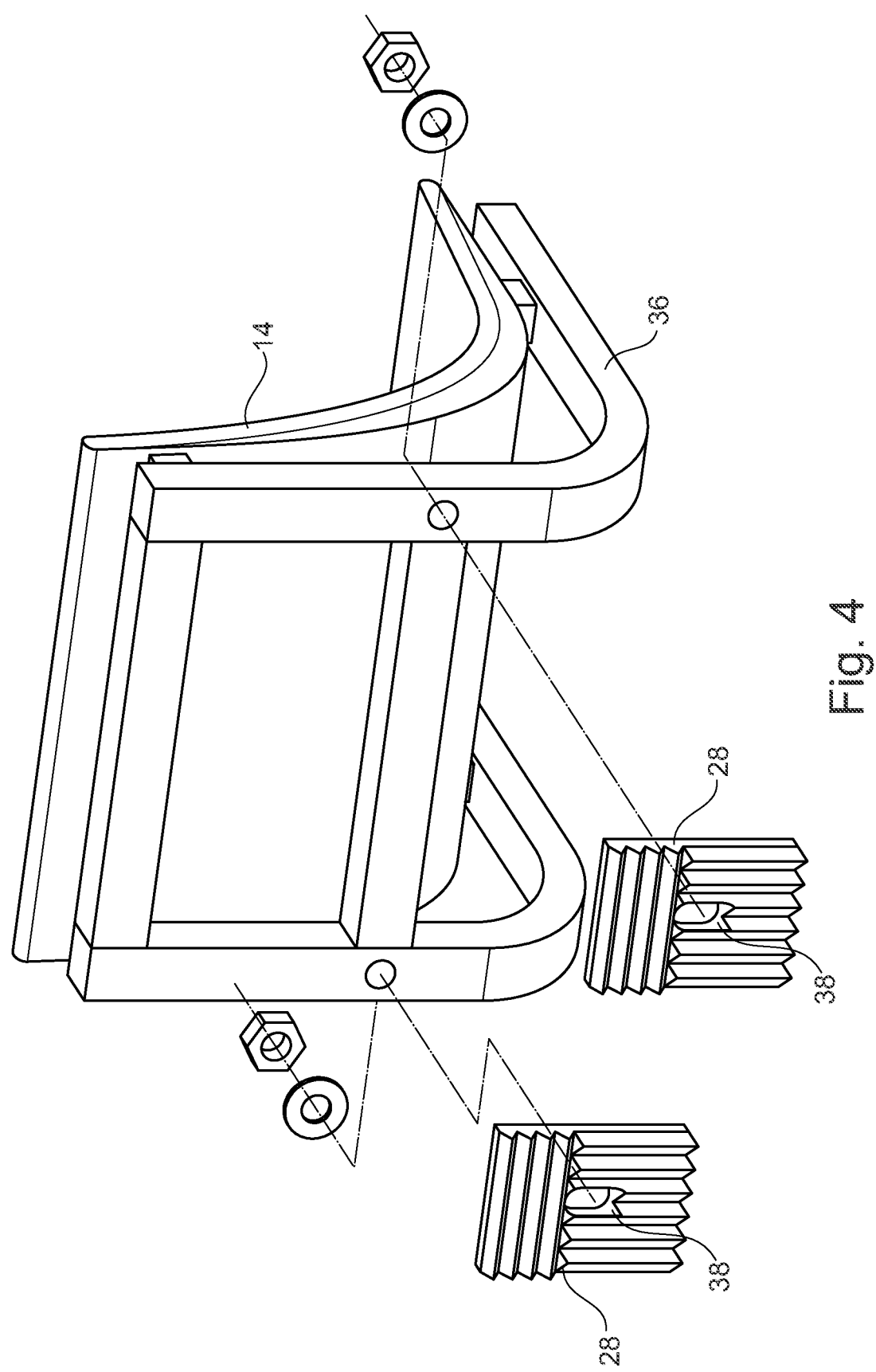
FIG. 4 is an isometric view showing the detail of the back of the seat from the seat attachment system of FIG. 3.

As shown in FIGS. 3 and 4, now concurrently referred to, the first shoulder 32a is provided with a first set of corrugations 34a and while the second shoulder 32b is provided with a second set of corrugations 34b. The first set of corrugations 34a extends longitudinally on an external face of the first shoulder 32a. In the present example, it will be assumed that the first set of longitudinally extending corrugations 34a covers at least partially the external surface of a first shoulder 32a. In the present example, the first shoulder 32a is depicted above the second shoulder 32b, but it may as well be located underneath. Similarly, the second set of corrugations 34b cover at least partially an external face of the second shoulder 32b. Both sets of corrugations 34a, 34b extend along a length of the rail 24. Whereas the first set of corrugations 34a is made of longitudinally extending corrugations spread over a predetermined width (for example, a few centimeters), the second set of corrugations 34b is made of corrugations extending to the first set of corrugations 34a, at an angle greater than zero from the corrugations of the first set of corrugations 34a so that both sets of corrugations 34a, 34b are non-parallel. For example, the corrugations of the second set of corrugations 34b may be oriented at 45 degrees from the corrugations of the first set of corrugations. Preferably, the corrugations of the second set of corrugations 34b are oriented perpendicular to the corrugations of the first set of corrugations 34a. Also, it is preferable that one set of corrugations (i.e. the first set of corrugations 34a) be aligned with a horizontal direction while the other set of corrugations (i.e. the second set of corrugations 34b) be aligned perpendicularly, or in the vertical direction in the present case. This is because passenger seats 14 typically require positioning along these two axes.

Advantageously, the first set of corrugations 34a may extend along the length of the rail 24 so that, if the rail 24 is made of an aluminum extrusion, they are integrally formed with the extrusion. The second set of corrugations 34b however, require to be formed by a secondary operation, such as milling for example, since they are not oriented in the extrusion direction of the rail 24. Alternatively, the second set of corrugations 34b could also be a separate component, for example made of an extrusion extruded along the direction of its corrugations, cut in lengths, and mounted to the rails 24.

Although the first set of corrugations 34a may extend the full length of the rail 24 (although not necessarily if the first set of corrugations 34a is made with a secondary operation), the second set of corrugations 34b does not have to extend the whole length of the rail 24. Indeed, the second set of corrugations 34b may be circumscribed to predetermined areas where seats are intended to be installed. For example, the second set of corrugations 34b may cover spaced apart areas of 300 mm, allowing for a variation as to where the passenger seats 14 may be installed.

Each passenger seat 14, and more precisely each seat frame 36 of a passenger seat 14, is equipped with the seat interface 28, itself having two matching and cooperating sets of corrugations: a third set of corrugations 34c and a fourth set of corrugations 34d. This is best shown in FIG. 4, now concurrently referred to. The third set of corrugations 34c is intended to match and interlock with the first set of corrugations 34a while the fourth set of corrugations 34d is designed to match and interlock with the second set of corrugations 34b. Consequently, the corrugations of the third set of corrugations are oriented at the same angle than the corrugations of the first set of corrugations 34a while the corrugations of the fourth set of corrugations 34d are oriented at the same angle than those of the second set of corrugations 34b. Hence, for example, if the second set of corrugations 34b is oriented perpendicularly to the first set of corrugations 34a, the fourth set of corrugations 34d will also be oriented perpendicularly to the third set of corrugations 34c.

The seat interface 28 may either be provided directly on the passenger seat 14, and more precisely on the seat frame 36, or it may be provided as a separate part which is itself mounted to the seat frame 36. For example, the seat interface 28 could be made of two separate extrusions (one as the third set of corrugations 34c and the second extrusion as the fourth set of corrugations 34d), cut in required lengths, and attached to the seat frame 36. In this case, the seat interface 28 may be riveted, welded, screwed, glued, or by any other adequate mounting solution, to the seat frame 36. The seat interface 28 may be provided with at least one aperture 38 for accommodating the fastener 26. The aperture 38 is located between the third set of corrugations 34c and the fourth set of corrugations 34d.

Prior to installing the passenger seat 14, the fastener 26 is inserted in the T-slot 30 approximately where the passenger seat 14 is intended to be installed. Then the passenger seat 14 is positioned so that the fastener 26 passes through the aperture 38 of the seat interface 28. The third set of corrugations 34c is then aligned with the first set of corrugations 34a so that the passenger seat 14 is positioned vertically at a desired or predetermined height with respect to the floor 18 of the passenger compartment 10. Similarly, the fourth set of corrugations 34d is aligned with the second set of corrugations 34b so as to position the passenger seat 14 longitudinally at a desired or predetermined longitudinal position along the length (or width if the passenger seat 14 is installed along a transversal wall) of the floor 18. Then, a nut 40 is installed on the fastener 26 and tightened so that the third set of corrugations 34c interlocks with the first set of corrugations 34a and so that the fourth set of corrugations 34d interlocks with the second set of corrugations 34b, thereby locating precisely and securing in position the passenger seat 14.

Several passenger seats 14 in the same row can be fastened to a common rail 24 secured to the chassis 16 along a length or width of the vehicle 12.

The present invention has been described with regards to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description.

What is claimed is:

1. A seat attachment system for a mass transit vehicle comprising:
   a rail adapted to be secured to a chassis of the mass transit vehicle, the rail having a longitudinal T-slot, the T-slot defining a first shoulder and a second shoulder each located on one opposite side of a narrow portion of the T-slot, the rail having a first set of corrugations extending longitudinally on an external face of the first shoulder and a second set of corrugations on an external face of the second shoulder, the second set of corrugations being non-parallel to the first set of corrugations;
   a fastener, the fastener being adapted to be received within the T-slot;
   a seat interface adapted to be mounted to a passenger seat, the seat interface having a third set of corrugations extending longitudinally along a first portion of the seat interface and a fourth set of corrugations extending on a second portion of the seat interface, the third set of corrugations being adapted to cooperate with the first set of corrugations and the fourth set of corrugations being adapted to cooperate with the second set of corrugations,
   wherein:
   the second set of corrugations is at a predetermined angle from the first set of corrugations and the fourth set of corrugations is at the same predetermined angle from the third set of corrugations, the third set of corrugations being operative to vertically locate the seat interface by interlocking with the first set of corrugations upon a compression force being developed by the fastener being tightened, the fourth set of corrugations being operative to locate horizontally the seat interface by interlocking with the second set of corrugations upon the compression force being developed by the fastener being tightened.

2. The seat attachment system of claim 1, wherein the second set of corrugations and the fourth set of corrugations are perpendicular respectively to the first set of corrugations and the third set of corrugations.

3. The seat attachment system of claim 1, wherein the first set of corrugations and the second set of corrugations extend along a whole length of the rail.

4. The seat attachment system of claim 1, wherein the third set of corrugations and the fourth set of corrugations extend along a whole length of the seat interface.

5. The seat attachment system of claim 1, wherein the seat interface has an aperture for accommodating the fastener, the aperture being located between the third set of corrugations and the fourth set of corrugations.

6. The seat attachment system of claim 1, further comprising the passenger seat, the passenger seat having a seat frame, the seat interface being mounted to the seat frame, the fastener being adapted to fasten the seat frame to the rail so that the passenger seat is secured to the rail.

7. The seat attachment system of claim 1, wherein the fastener is a T-bolt.

8. A mass transit vehicle comprising a chassis and a passenger compartment, wherein the passenger compartment comprises a seat attachment system according to claim 1, and wherein the rail of the seat attachment system is secured to the chassis of the mass transit vehicle.

9. The mass transit vehicle of claim 8, further comprising a passenger seat having a seat frame, the seat interface of the seat attachment system being mounted to the seat frame, the fastener of the seat attachment system being adapted to fasten the seat frame to the rail of the seat attachment system so that the passenger seats is secured to the rail of the seat attachment system.

10. A mass transit vehicle comprising a chassis and a passenger compartment, wherein the passenger compartment comprises at least a first seat attachment system according to claim 1 and a second seat attachment system according to claim 1, wherein the rail of the first seat attachment system and the rail of the second seat attachment system constitute a single rail secured to a chassis of the mass transit vehicle.

11. The mass transit vehicle of claim 10, further comprising a row of at least a first passenger seat and a second passenger seat, each having a seat frame, the seat interface of the first seat attachment system being mounted to the seat frame of the first passenger seat, the fastener of the first seat attachment system being adapted to fasten the seat frame of the first passenger seat to the single rail, the seat interface of the second seat attachment system being mounted to the seat frame of the second passenger seat, the fastener of the second seat attachment system being adapted to fasten the seat frame of the second passenger seat to the single rail so that the first passenger seat and the second passenger seat are secured to the single rail.

* * * * *